United States Patent
Ouchi

(10) Patent No.: US 6,800,033 B2
(45) Date of Patent: Oct. 5, 2004

(54) WHEEL DRIVE UNIT

(75) Inventor: Hideo Ouchi, Kanagawa (JP)

(73) Assignee: NSK Limited, Tokyo (JP)

( * ) Notice: Subject to any disclaimer, the term of this patent is extended or adjusted under 35 U.S.C. 154(b) by 0 days.

(21) Appl. No.: 09/931,653

(22) Filed: Aug. 16, 2001

(65) Prior Publication Data

US 2002/0072421 A1 Jun. 13, 2002

Related U.S. Application Data

(63) Continuation of application No. PCT/JP01/07045, filed on Aug. 15, 2001, now abandoned.

(30) Foreign Application Priority Data

Aug. 22, 2000 (JP) ........................................ 2000-251317

(51) Int. Cl.[7] .............................................. B60B 27/00
(52) U.S. Cl. ...................... 464/178; 464/145; 301/105.1
(58) Field of Search ................................ 464/145, 178, 464/906; 301/105.1, 124.1; 384/544; 180/252

(56) References Cited

U.S. PATENT DOCUMENTS

| | | | |
|---|---|---|---|
| 5,822,859 A | | 10/1998 | Kessen et al. |
| 6,135,571 A | * | 10/2000 | Mizukoshi et al. ..... 464/178 X |
| 6,319,337 B1 | * | 11/2001 | Yoshida et al. |
| 6,357,925 B2 | * | 3/2002 | Tajima et al. ......... 301/105.1 X |
| 6,413,008 B1 | * | 7/2002 | Van Dest et al. ....... 384/544 X |
| 6,422,758 B1 | * | 7/2002 | Miyazaki et al. ........... 384/544 |
| 2001/0004611 A1 | * | 6/2002 | Sahashi et al. ............. 464/145 |

FOREIGN PATENT DOCUMENTS

| | | |
|---|---|---|
| DE | 197 00 313 | 7/1997 |
| EP | 0 854 303 | 7/1998 |
| EP | 0 936 086 | 8/1999 |
| JP | 05-009583 | 1/1993 |
| JP | 08-014266 | 1/1996 |
| JP | 10-148216 | 6/1998 |
| JP | 11-129703 | 5/1999 |
| JP | 11-151904 | 6/1999 |
| JP | 2000-142009 | 5/2000 |

* cited by examiner

Primary Examiner—Greg Binda
(74) Attorney, Agent, or Firm—Katten Muchin Zavis Rosenman

(57) ABSTRACT

A wheel drive unit is provided to comprise a bearing unit 3c for wheel drive which is light in weight and low in cost. The components constituting the bearing unit 3c for wheel drive have optimum properties to secure the durability thereof.

Of the components constituting the bearing unit 3c for wheel drive, the portions indicated by a diagonal grid harching are quench-hardened with the other portions being not quench-hardened and left as they are, whereby the rolling fatigue life and wear-resistance of the components are improved and cracking is prevented.

2 Claims, 8 Drawing Sheets

WHEEL DRIVE UNIT

This is a continuation under 35 U.S.C. §120 of International Application PCT/JP01/07045, filed Aug. 15, 2001 now abandoned.

FIELD OF THE INVENTION

The present invention relates to a wheel drive unit which is a combination of a wheel support rolling bearing unit, a constant velocity joint unit and a snap ring, and is used for rotatably supporting with respect to a suspension unit, a driven wheel {the front wheel of a FF vehicle (front engine, front drive wheel) the rear wheel of both a FR vehicle (front engine, rear drive wheel) and a RR vehicle (rear engine, rear drive wheel) and all wheels of a 4 WD vehicle (four drive wheel)} supported on an independent suspension type suspension, and for rotationally driving the driven wheel.

BACKGROUND OF THE INVENTION

In order to rotatably support a vehicle wheel with respect to a suspension unit, various kinds of rolling bearing units for wheel support with an outer ring and inner ring assembled so as to be freely rotatable via rolling elements, are used. Moreover, a wheel support rolling bearing unit for supporting a driven wheel in a suspension of the independent suspension type and rotationally driving the driven wheel, must be combined with a constant velocity joint to smoothly transmit (maintain constant velocity) the rotation of the drive shaft to the abovementioned vehicle wheel, regardless of the relative displacement between a differential gear and the driven wheel and of a steering angle applied to the wheel. FIG. 6 shows a typical bearing unit 3 for wheel drive wherein a rolling bearing unit 1 for wheel support and a constant velocity joint 2 are combined together for this kind of purpose.

This rolling bearing unit for wheel support 1 is found by rotatably supporting a hub 5 and an inner ring 6 on the inner diameter side of an outer ring 4 via a plurality of rolling elements 7. Of these, the outer ring 4 when connectingly secured to a knuckle 9 (refer to FIG. 7 mentioned below) constituting a suspension unit by means of a first flange 8 provided on the outer peripheral face thereof, does not rotate even at the time of use. Furthermore, a double row of outer ring raceways 10 is provided on the inner peripheral face of the outer ring 4, and the hub 5 and the inner ring 6 are rotatably supported on the inner diameter side, concentric with the outer ring 4.

Of these, the hub 5 is provided with a second flange 11 for supporting the wheel, on a portion near an outer end (the end which is on the outside in a widthwise direction of the vehicle when fitted to the vehicle, namely, the left hand side of each figure including FIG. 6) of the outer peripheral face. Furthermore, the first inner ring raceway 12 is formed on a central portion of the outer peripheral face of the hub 5. Similarly, an inner ring 6 with a second inner ring raceway 14 formed on an outer peripheral face thereof, is externally secured to a small diameter step 13 formed on an inner end (the end which is on the middle side in a widthwise direction of the vehicle when fitted to the vehicle, namely the right hand side of each figure). Moreover, in the center portion of the hub 5, a spline bore 15 is provided, so that the hub 5 is formed in a hollow cylindrical shape.

On the other hand, the constant velocity joint 2 has an outer ring 16 for constant velocity joint, an inner ring 17 for constant velocity joint and a spline shaft 18. Of these, the outer ring 16 for constant velocity joint and the spline shaft 18 constitute a drive member 19. That is, the spline shaft 18 is provided on an outer end of the drive member 19 and is freely engaged with the spline bore 15, and the outer ring 16 for constant velocity joint is provided on an inner end of the drive member 19. At a plurality of places on the inner peripheral face of the outer ring 16 for constant velocity joint around the circumferential direction are respectively formed outside engaging grooves 20 at right angles to the circumferential direction. Moreover, regarding the inner ring 17 for constant velocity joint, a second spline bore 21 is formed at right angles to the circumferential direction in a center portion, and on the outer peripheral face, inside engaging grooves 22 are formed at right angles to the circumferential direction in portions coinciding with the outside engaging grooves 20. Moreover, balls 23 are provided between each of the inside engaging grooves 22 and each of the outside engaging grooves 20 so as to be freely rotatable along each engaging groove 22 and 20, with the balls 23 being retained in cage 24. At a part of the inner peripheral face of the outer ring 16 for constant velocity joint, portions between pairs of circumferentially adjacent outside engaging grooves 20 constitute cage guide faces 25. Each cage guide face 25 is positioned on a single spherical surface with a displacement center of the constant velocity joint 2 as the center thereof. Regarding the shape of the constituent elements of this kind of constant velocity joint 2, this is similar to the case of a well known Rzeppa type or Birfield type constant velocity joint, and since this has no relevance to the gist of the present invention, detailed description is omitted.

In combining the above described constant velocity joint 2 and the wheel support rolling bearing unit 1, the spline shaft 18 is inserted into the spline bore 15 of the hub 5 from the inner side towards the outer side. Then a nut 27 is screwed onto an external thread portion 26 provided on an outer end portion of the spline shaft 18 projecting from an outer end face of the hub 5, and then by tightening, these are connected and secured together. In this condition, since the inner end face of the inner ring 6 is abutted against the outer end face of the outer ring 16 for constant velocity joint, there is no displacement of the inner ring 6 in a direction to come off from the small diameter step portion 13. At the same time, an appropriate pre-load is applied to each of the rolling elements 7.

Moreover, when fitted to the suspension unit of a vehicle, a male spline portion 29 provided on an outer end of a drive shaft 28 is spline engaged with a second spline bore 21 provided in a central portion on the inner ring 17 for constant velocity joint. Then, a snap ring 37 which is stoppingly engaged in an engaging groove 30 formed around the whole periphery in the outer peripheral face at the outer end of the male spline portion 29, is engaged with an engaging step portion 32 formed in an opening rim at the outer end of the second spline bore 21, thereby preventing the male spline portion 29 from coming out from the second spline bore 21. Furthermore, the inner end of the drive shaft 28 is connectingly secured to the center of a trunnion 34 (refer to FIG. 1 showing a first example of an embodiment of the present invention) of a tripod type constant velocity joint 33 provided on an output shaft of a differential gear.

Regarding the first example of the abovementioned conventional construction shown in FIG. 6, the weight is increased because the rolling bearing unit 1 for wheel support and the constant velocity joint 2 are connectingly secured based on the threaded and tightened engagement between the male thread portion 29 and the nut 27. That is, providing the external thread portion 26 on the spline shaft 18 of the constant velocity joint 2 requires lengthening of the spline shaft 18, and the nut 27 also becomes necessary. Therefore the axial dimension and the weight of the bearing unit 3 for wheel drive are increased by the male thread portion 26 and the nut 27.

To address this problem, in the specification of U.S. Pat. No. 4,881,842 is disclosed as shown in FIG. 7, a bearing unit 3a for wheel drive that enables shortening of the axial dimension and a reduction in weight, by connectingly securing the rolling bearing unit for wheel support and the constant velocity joint by a relatively simple construction. Also in the case of the secured example of the conventional construction shown in FIG. 7, a hub 5 is rotatably supported on the inside of an outer ring 4 secured to a knuckle 9, by rolling elements 7 arranged in a double row. Moreover, a spline shaft 18 of a drive member 19a is spline engaged with a spline bore 15 formed in a central portion of the hub 5. An engaging portion 35 is formed in an outer end surface of the spline shaft 18 for engaging with a tool for drawing the spline shaft 18 into the spline bore 15. Furthermore, the spline shaft 18 is prevented from coming off from the hub 5 by a snap ring 31 which is stoppingly engaged in an engaging groove 36 formed in an outer peripheral face of the spline shaft 18 at a portion close to its tip end (outer end). In this condition, an resilient ring 34 is resiliently compressed between the hub 5 and the outer ring 16 for constant velocity joint of the drive member 19a, thereby effecting play prevention of the spline shaft 18 and the hub 5. In the case of the second example of this kind of conventional construction, to the extent that connection of the rolling bearing unit 1a for wheel support and the constant velocity joint 2a is performed by the snap ring 31, an overall smaller size and lighter weight for the bearing unit 3a for wheel drive is achieved.

Moreover, in Japanese Patent Publication No. Tokukai Hei 10-264655 is disclosed a bearing unit 3b for wheel drive such as shown in FIG. 8. A rolling bearing unit 1b for wheel support constituting the bearing unit 3b for wheel drive has a hollow hub 5a such that a constant velocity joint outer ring 16a constituting a constant velocity joint 2b corresponding to the drive member described in the claims, is connected to an inner end of the hollow hub 5a via a spacer 38. Of the inner and outer peripheral surfaces of this spacer 38 formed in a short cylindrical shape, an inner diameter side female spline portion 39 is formed on the inner peripheral surface of the spacer 38, and an outer diameter side male spline portion 40 corresponding to the first spline portion described in the claims is formed on the outer peripheral surface of the spacer 38. This spacer 38 is assembled on an outer peripheral face at the inner end of the hub 5a, with an inner diameter side male spline portion 41 formed on an outer peripheral surface thereof in spline engagement without play with the inner diameter side female spline portion 39. Then, in this condition, an inner end face of the spacer 38 is clamped by a crimped portion 42 formed on the inner end of the hub 5a, so that the spacer 38 is secured without play to the inner end of the hub 5a. Moreover, in Japanese Patent Publication No. Tokukai Hei 10-264655 is also disclosed a construction where the inner ring and the spacer are formed as one body.

On the other hand, an outer diameter side female spline portion 43 corresponding to the second spline portion described in the claims, which is formed on the inner peripheral face at the outer end of the outer ring 16a for constant velocity joint is spline engaged with an outer diameter side male spline portion 40. That is, the outer diameter side female spline portion 43 is formed in an inner peripheral face at the outer end of the outer ring 16a for constant velocity joint. Moreover, as mentioned above, the outer diameter side female spline portion 43 is spline engaged with the outer diameter side male spline portion 40 formed on the outer peripheral surface of the spacer 38.

A snap ring 31a spans between the outer diameter side female spline portion 43 and the outer diameter side male spline portion 40 which are spline engaged with each other as described above, so that the outer ring 16a for constant velocity joint cannot separate from the spacer 38. That is, the snap ring 31a is formed in a semi-circle annular shape and made to span between an inside engaging groove 44 corresponding to a first connecting portion described in the claims, which is formed around the whole periphery in the outer peripheral surface of the spacer 38, and an outside engaging groove 45 corresponding to a second connecting portion described in the claims, which is formed around the whole periphery in the inner peripheral surface at the outer end of the outer ring 16a for constant velocity joint. Hence the outer ring 16a for constant velocity joint and the spacer 38 cannot be displaced from each other in the axial direction.

The construction of the connecting portion of the hub 5a and the outer ring 16a for constant velocity joint is as mentioned above, and this hub 5a is rotatably supported on the inner diameter side of the outer ring 4 by a double row angular type ball bearing. An inner ring 6 constituting this ball bearing is clampingly secured between an outer end face of the spacer 38 and a step face 46 existing on the outer end of a small diameter step portion 13 formed on an outer peripheral face at the central portion of the hub 5a.

In the case of the bearing unit 3b for wheel drive described in Japanese Patent Publication No. Tokukai Hei 10-264605 as described above, the spline shaft 18 can be omitted from the second example of the conventional construction shown in FIG. 7, and to that extent, the cost and weight can be further reduced.

In the case of the second and third examples of the conventional construction shown in FIG. 7 and FIG. 8, in comparison to the case of the first example of the conventional construction shown in FIG. 6, a reduction of cost and weight is effected. However, in order to sufficiently maintain the durability of each constituent element, it is necessary to optimize the properties of each constituent element. That is, at the time of using the wheel drive unit, various kinds of stress such as, force in the compression direction, force of the bending direction, and force in the tension direction and the like, are applied to each constituent element of the rolling bearing unit for wheel support and the constant velocity joint which are combined together to form the wheel drive unit. However with regards to this point, heretofore no consideration has been given to make the properties of each constituent element optimum to deal with these stresses.

DISCLOSURE OF THE INVENTION

The present invention was invented taking this situation into consideration, in order to optimize the properties of each constituent element so as to ensure durability of the wheel drive unit.

The present invention provides a wheel drive unit comprising a rolling bearing unit for vehicle wheel, a constant velocity joint unit and a snap ring, the constant velocity joint unit comprising a first constant velocity joint having an output portion and a input portion connected to an output portion of a differential gear, a transmission shaft having an output end and an input end connected to the output portion of the first constant velocity joint, and a second constant velocity joint having an output portion and an input portion connected to the output end of the transmission shaft, the rolling bearing unit for vehicle wheel comprising an outer ring having an inner peripheral surface formed with outer ring raceways and being not rotatable during use, a hollow hub having an outer peripheral surface formed with an flange for supporting a vehicle wheel near the outer end thereof, with a first inner ring raceway at the middle portion thereof, and with a small diameter stepped portion formed near the inner end thereof, an inner ring having an outer peripheral surface formed with a second inner ring raceway and fitted onto the small diameter stepped portion of the hub, the hub having the inner ring from coming out of the smaller diameter portion, a plurality of rolling members rotatably provided between each of the outer ring raceways and the first and second inner ring raceways, and a first spline portion provided on a peripheral surface portion of the hub or a member securely connected to the hub, the second constant velocity joint comprising a drive member having a peripheral surface at the outer end thereof formed with a second spline portion in spline engagement relation with the first spline portion, and an outer ring for constant velocity joint at the inner end thereof to constitute the second constant velocity joint, a first engagement portion provided on a peripheral surface portion of the hub or a member securely connected to the hub, a second engagement portion provided on the peripheral surface at the outer end of the drive member, the snap ring spanned between the first engagement portion and the second engagement portion to prevent disengagement between the first spline section and second spline section, the smaller diameter stepped portion of the hub having a stepped face portion at the innermost end thereof, the inner ring having an inner end face abutted to the stepped surface portion, on the outer peripheral surface of the hub, at least the first inner ring raceway and the stepped surface portion being quench-hardened, on the inner peripheral surface of the hub, at least a portion located on the inner diameter side of the quench-hardened stepped surface portion, and the crimped portion being not quench-hardened, at least one of the hub or the member securely connected to the hub and the drive member having a peripheral portion being formed with an engagement groove for the first and second engagement portions and not quench-hardened, the outer ring for constant velocity joint being formed with outside engagement groove portions on the inner peripheral surface thereof with cage guide portions each existing between a circumferentially adjacent pair of the cage guide portions, and on the inner peripheral surface of the outer ring for constant velocity joint, at least the outside engagement groove portions and the cage guide portions being quench-hardened.

DESCRIPTION OF THE BEST EMBODIMENT FOR WORKING THE INVENTION

Figure 1:
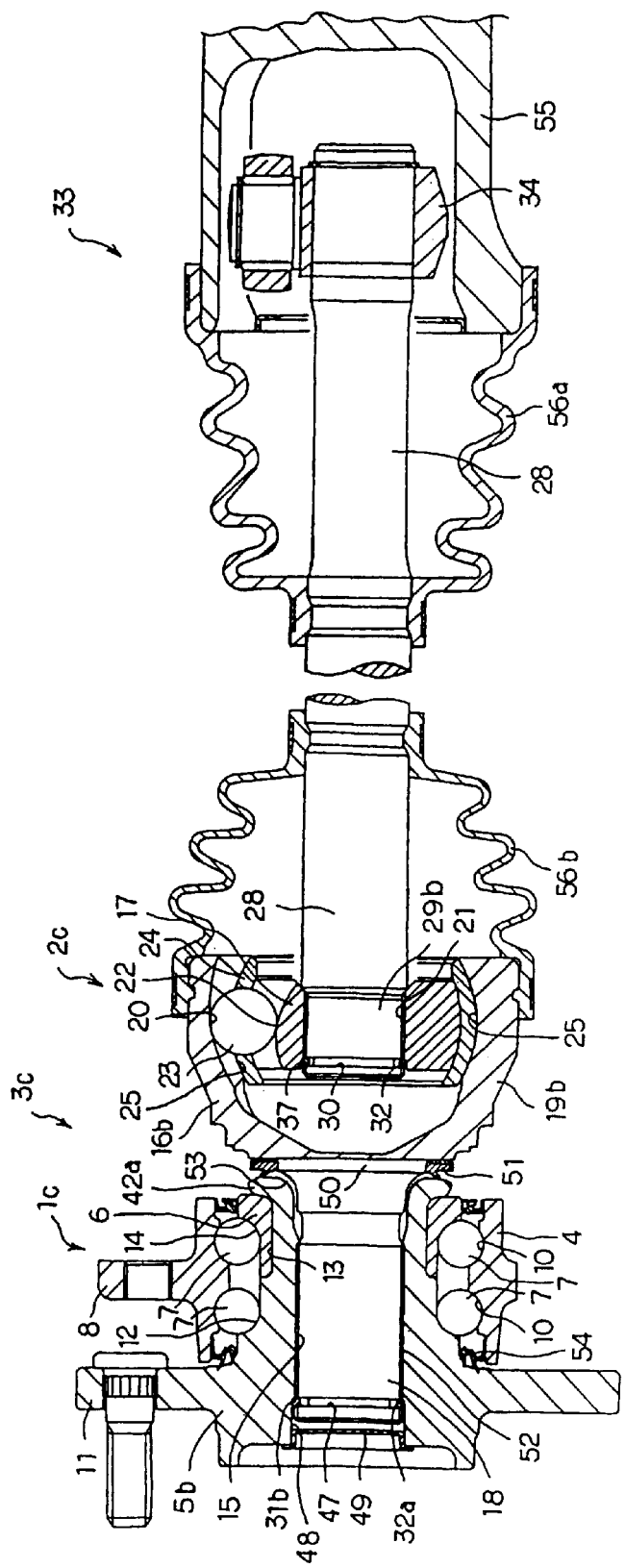
FIG. 1 is a cross-sectional view to show a first example of the embodiment of the present invention.

The wheel drive unit of the present invention comprises a rolling bearing unit for wheel support, a constant velocity joint unit and a snap ring.

Of these, the constant velocity joint unit has a first constant velocity joint for connecting an input portion thereof to an output portion of a differential gear, a transmission shaft with an input side end portion thereof connected to an output portion of the first constant velocity joint, and a second constant velocity joint with an input portion thereof to an output side end portion of the transmission shaft connected.

Furthermore, the rolling bearing unit for wheel support has an outer ring, a hollow hub, rolling elements and a first spline portion.

Of these, the outer ring has a double row of outer ring raceways on an inner peripheral face thereof and does not rotate at the time of use.

Moreover, the hub is provided with a flange for supporting a vehicle wheel, on a part near an outer end of an outer peripheral face thereof, and a first inner ring raceway on a central portion thereof. An inner ring with a second inner ring raceway formed on an outer peripheral face thereof is externally secured to a small diameter step portion formed on a part of the outer peripheral face near the inner end thereof, and the coming off of the inner ring from the small diameter step portion is prevented by a crimped portion formed by plastic deformation of the inner end portion in a radially outward direction.

Furthermore, the rolling elements are respectively provided severally so as to be freely rotatable between each of the outer ring raceways and each of the first and second inner ring raceways.

Moreover, the first spline portion is provided on the hub or on a part of a peripheral face of a member connectingly secured to the hub.

In addition, the second constant velocity joint incorporates a drive member with a second spline portion for spline engagement with the first spine portion provided on an outer end peripheral face thereof, and an inner end portion serving as a constant velocity joint outer ring constituting the second constant velocity joint.

Moreover, in a condition with the first spline portion and the second spline portion spline connected to each other, the snap ring spans between a first engaging portion provided on the hub or a part of the periphery of a member connectingly secured to the hub, and a second engaging portion provided on a peripheral face at the outer end of the drive member, thereby preventing the separation of the connection between the first spline portion and the second spline portion.

Furthermore, of the outer peripheral face of the hub, at least the first inner ring raceway portion and the stepped face portion existing at the innermost end of the small diameter step portion which abuts with the outer end face of the inner ring, are quench-hardened. Furthermore, at least a portion of the inner peripheral face of the hub, positioned on the inner diameter side of the portion that is quench-hardened corresponding to the small diameter step portion, and the portion for forming the crimped portion are not quench-hardened. Moreover, at least one portion of the peripheral face of at least one of the hub or a member connectingly secured to the hub, and the drive member, which is formed with the engaging groove for serving as the first connecting portion or the second connecting portion, is not quench-hardened. In addition, of the inner peripheral face of the outer ring for constant velocity joint, at least the outside engaging groove portion and the cage guide face portion existing between each of the circumferentially adjacent outside engaging groove pairs are quenched-hardened.

According to the wheel drive unit of the present invention constructed as described above, because the properties of each constituent element can be such as to correspond optimally to the stress etc. applied to each member, the durability can be sufficiently ensured.

Firstly, of the outer peripheral face of the hub, because the first inner ring raceway portion is quench-hardened, the rolling fatigue life of this first inner ring raceway portion is improved. Furthermore, because the stepped face portion existing at the innermost end of the small diameter step portion is quench-hardened, the thrust load which this stepped face portion bears can be made sufficiently large. Accordingly, when the crimped portion is formed on the inner end portion of the hub in a condition with the other end face of the inner ring abutted against the stepped face portion, so that the inner ring is secured to the hub, there is no plastic deformation of the stepped face portion. As a result, by clamping the inner ring with the crimped portion an appropriate pre-load can be applied to each rolling element.

Furthermore, at at least a part of the inner peripheral face of the hub, positioned on the inner diameter side of the quench-hardened portion corresponding to the small diameter step portion, is not quench-hardened, and therefore there is no quench-hardened portion penetrating from the inner peripheral face of the hub to the outer peripheral face thereof. Therefore, the existence of a partially brittle portion in the hub is prevented. Hence damage such as cracking occurring in the hub during the process of quench-hardening of the hub, or lowering of the shock resistance of the hub can be prevented.

Furthermore, because the portion of the hub to be crimped is not quench-hardened, when forming the crimped portion in order to connectingly secure the inner ring to the hub, damage such as cracking does not occur at this crimped portion, and a high quality crimped portion can thus be formed. Furthermore, at one portion of the peripheral face of at least one of the hub or a member connectingly secured to the hub, and the drive member, which is formed with the engaging groove being the first connecting portion or the second connecting portion, is not quench-hardened. Therefore, damage such as cracking due to heat treatment does not occur in the portion where the abovementioned engaging groove is formed and where distortion can easily occur with heat treatment.

Moreover, of the inner peripheral face of the outer ring for constant velocity joint, the rolling fatigue life of the outer engaging groove portion is improved with the quench-hardening of the outer engaging groove portion. Furthermore, of the inner peripheral face of the outer ring for constant velocity joint, since the cage guide face portion existing between the circumferentially adjacent outer engaging groove pairs is quench-hardened, the wear resistance and seizure resistance of the cage guide face portion which rubbingly contacts with the outer peripheral face of the cage constituting the constant velocity joint can be improved.

Now, the present invention is further explained referring to the attached drawings.

Figure 2:
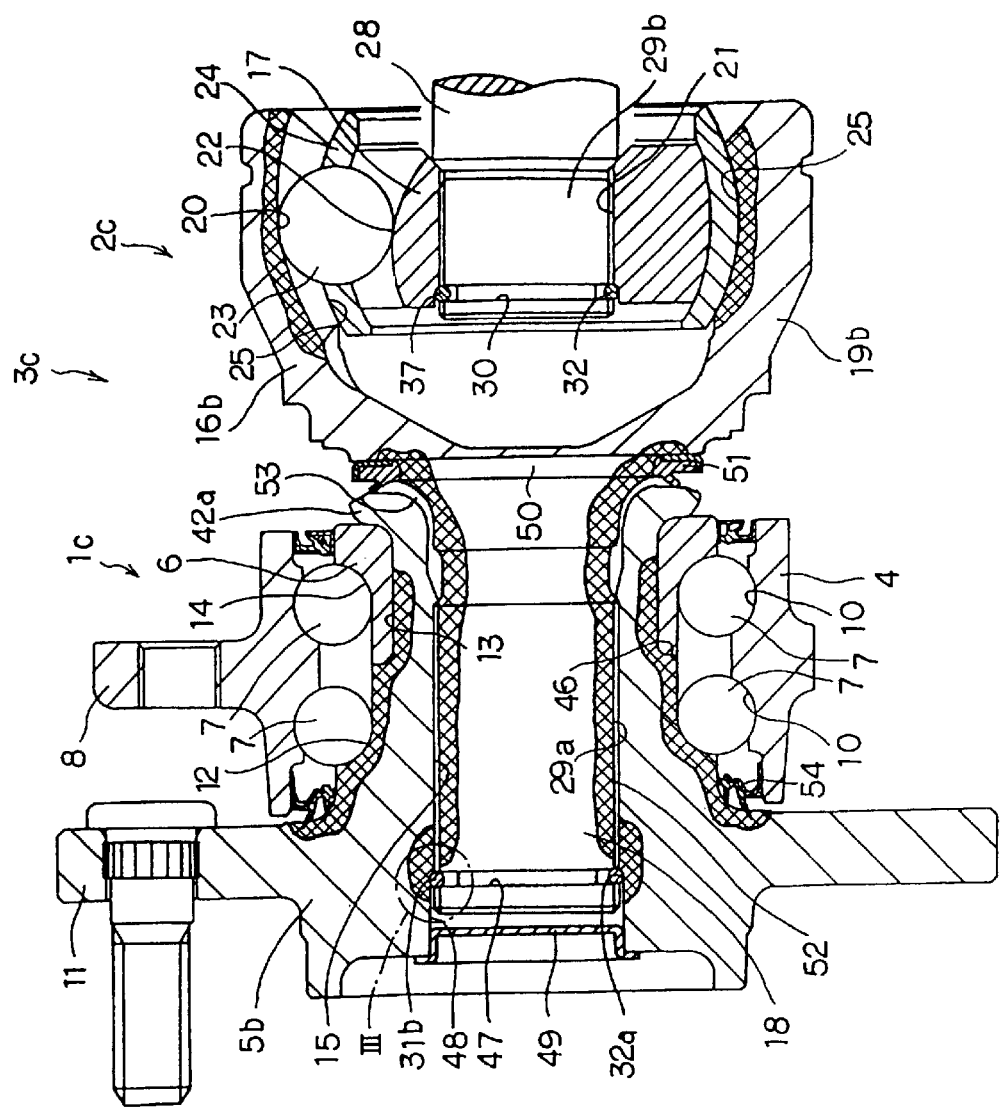
FIG. 2 is a partly cut-away cross sectional view to show a left part of FIG. 1.
Figure 3:
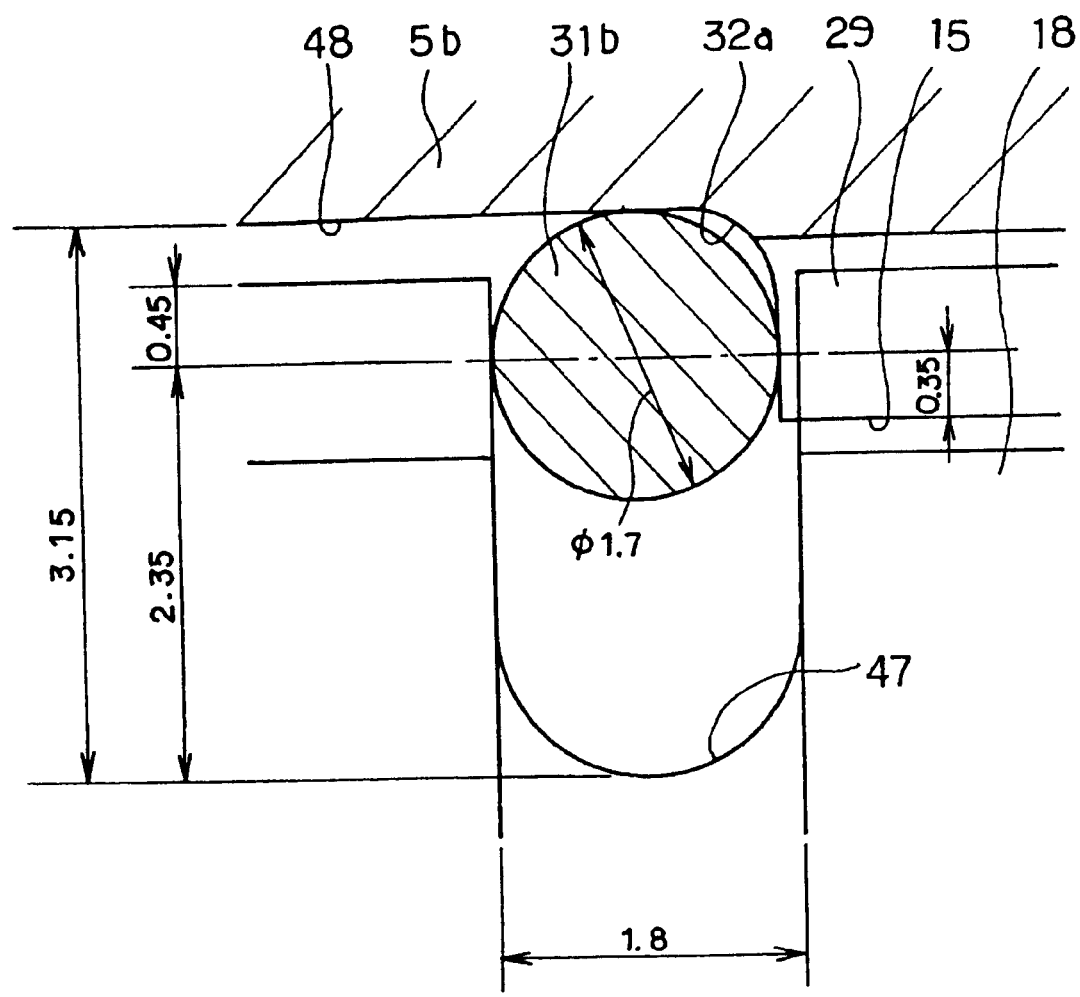
FIG. 3 is an enlarged view of Portion III of FIG. 2.
Figure 6:
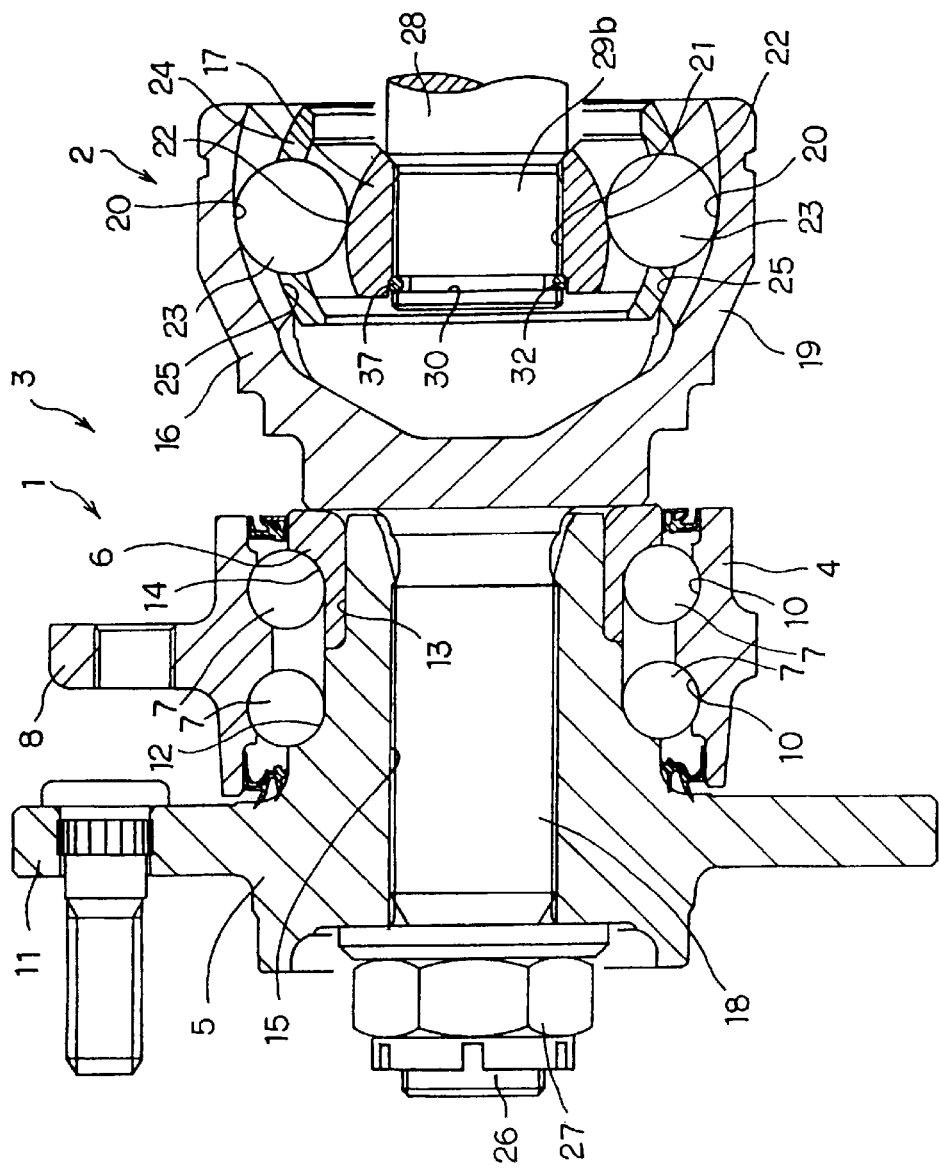
FIG. 6 is a cross sectional view to show a first example of the conventional structure.
Figure 7:
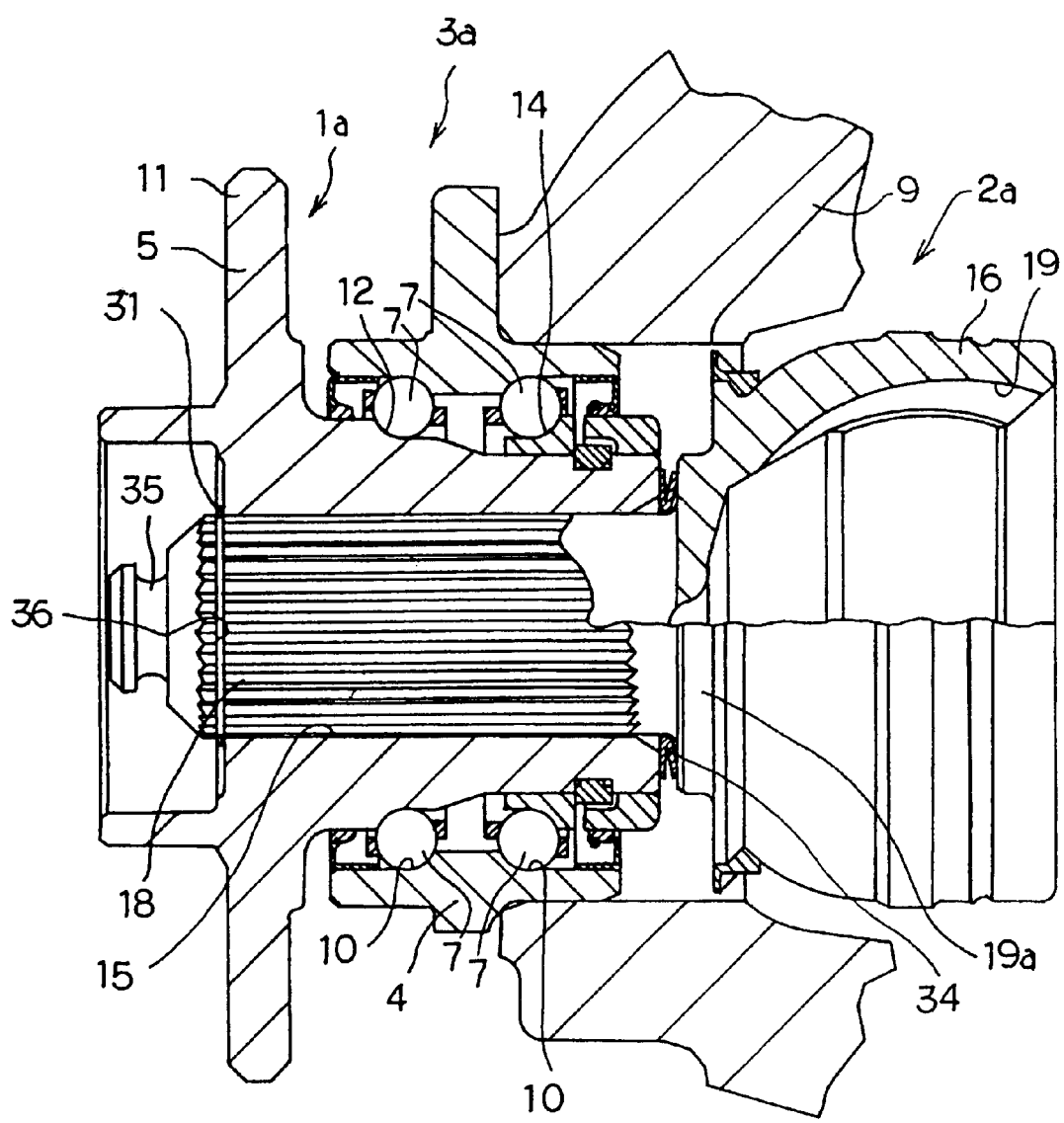
FIG. 7 is a cross sectional view to show a second example of the conventional structure.
Figure 8:
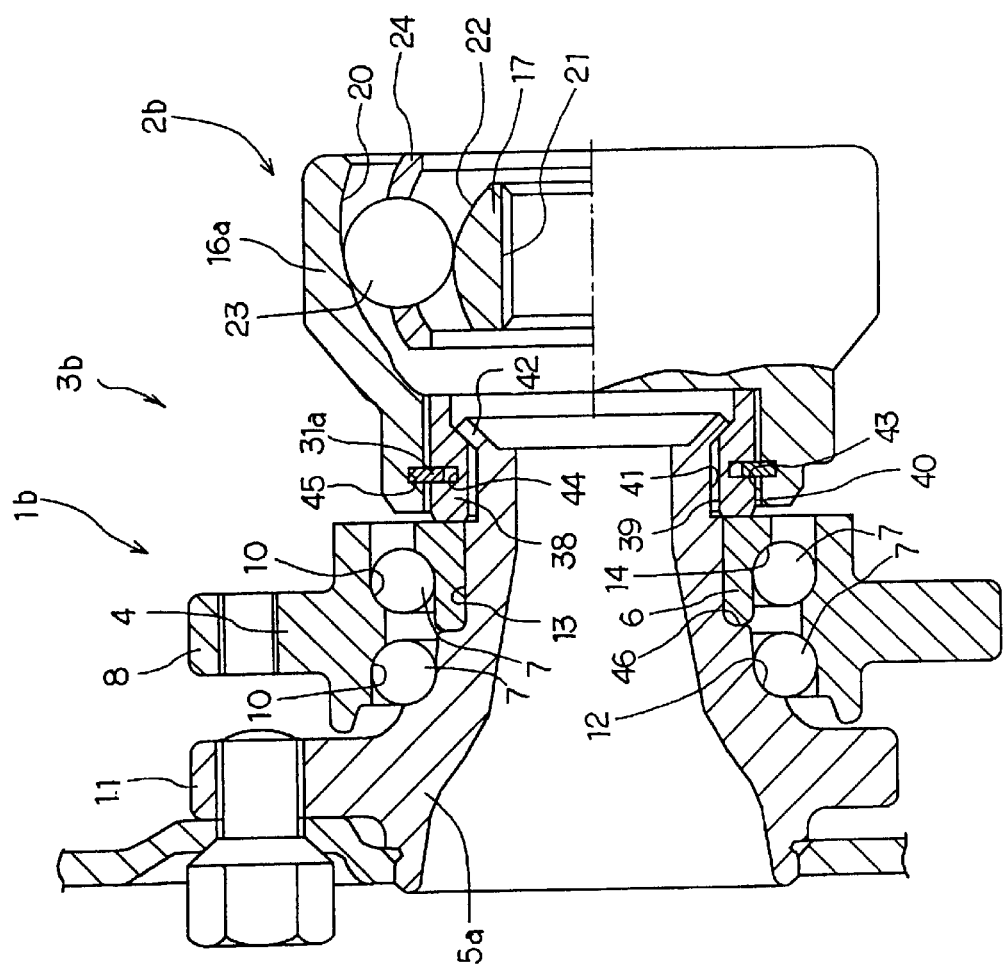
FIG. 8 is a cross sectional view to show a third example of the conventional structure.

FIG. 1 to FIG. 3 show a first example of an embodiment of the present invention corresponding to claims of the invention. A characteristic of the present invention is the point that with a construction enabling easy connection of a rolling bearing unit 1c for wheel support constituting a drive unit for vehicle wheel, to a constant velocity joint 2c, being a second constant velocity joint described in the claims, the reliability and durability of the rolling bearing unit 1c for wheel support and the constant velocity joint 2c is ensured. Part of the basic construction of a bearing unit for wheel drive formed by combining the rolling bearing unit 1c for wheel support and the constant velocity joint 2c has many portions common to some of the conventional constructions shown in the FIG. 6 to FIG. 8. Therefore, equivalent portions are denoted by the like reference symbols, and repeated explanation is omitted or made briefly. Hereunder is a description centered on the different points between the characteristic portions of the present invention and those of the aforementioned conventional construction.

A hub 5b constituting the rolling bearing unit 1c for wheel support, is prepared to an approximate shape by hot forging a material such as S53CG, and is then processed to a desired shape and properties by subjecting to machining, induction hardening, grinding and superfinishing. Of this, regarding the part subjected to induction hardening, this will be explained in detail later, but of the surface of the hub 5b, the surface hardness of the portion subjected to this induction hardening is $H_RC$ 58~64, and the effective thickness of the hardened layer is around 1.5~3 mm.

An inner ring 6 formed with a second inner ring raceway 14 on an outer peripheral face thereof, is externally fitted to a small diameter step portion 13 formed on a portion near the inner end of the hub 5b formed as mentioned above. This inner ring 6 is prepared to an approximate shape by hot forging a material such as SUJ2, and then processed to a desired shape and properties by subjecting to machining, dip quenching, grinding and superfinishing. The hardness is $H_RC$60~64. Then, in order to prevent the inner ring 6 formed as mentioned above from coming off from the abovementioned small diameter step portion 13, a crimped portion 42a is formed on an inner end portion of the hub 5b. That is, after the inner ring 6 is externally fitted to the small diameter step portion 13, the portion at the inner end of the hub 5b projected from the inner end face of this inner ring 6 is plastically deformed radially outward to form the crimped portion 12a, and the inner end face of the inner ring 6 is thus retained by this crimped portion 42a.

Furthermore, an engaging groove 47 corresponding to the second connecting portion described in the claims, is formed around the entire periphery in the outer peripheral face at the outer end of the spline shaft 18 constituting the drive member 19b incorporated into the constant velocity joint 2c. The drive member 19b including the spline shaft 18 is preferred to an approximate shape by hot forging a material such as S55CG, and is then processed to a desired shape and properties by subjecting to machining, induction hardening, grinding and superfinishing. Of this, regarding the part subjected to induction hardening, this will be explained in detail later, but of the drive member 19b, the surface hardness of the portion subjected to this induction hardening is $H_RC$ 58~64. Regarding the effective thickness of the hardened layer, this differs depending on location, but is around 2~7.5 mm. For example, regarding the inner peripheral face portion of the outer ring 16b for constant velocity joint, because this is subjected to grinding after the quench-hardening, the thickness is around 2~4 mm. On the other hand, the outer peripheral face portion of the spline shaft 18 is not subjected to grinding and hence has a thickness of around 5~7.5 mm.

In the condition with the spline shaft 18 inserted into the spline bore 15 provided in the center of the hub 5b to thus constitute the bearing unit 3c for wheel drive, the half on the outer diameter side of a snap ring 31b is engaged with the engaging step portion 32a corresponding to the first engaging portion described in the claims, formed on a portion of the inner peripheral face near the outer end of the hub 5b, while the half on the inner diameter side thereof stoppingly engaged in the engaging groove 47, thereby preventing the spline shaft 18 from coming out from the spline bore 15. The snap ring 31b is formed by bending into a semi-circle annular shape a material with a circular cross-section such as SWPA and SWPB, and in a free state has resilience in the direction for expanding the diameter. Moreover, the hardness is $H_RC$ 48~54.

The dimensions of this snap ring 31b are, as mentioned below, fixed by design so that the allowable stress is not exceeded when passing through the spline bore 15 in order to assemble the bearing unit 3c for wheel drive, and at the time of use. In this case, if the spline module is fixed, the diameter of the cross-section of the snap ring 31b can be increased as the pitch circle diameter of the spline is increased. For example, in general use, in the case where an involute tooth profile with the module being 1 and the pressure angle being 45 degrees, is considered, when the pitch circle diameter is 24 mm, the diameter of the cross-section is made 1.4 mm. Similarly when the pitch circle diameter is 30 mm, the diameter of the cross-section is made 1.7 mm. Furthermore, also regarding the dimensions of the installation portion for the snap ring 31b, this is fixed by design to correspond to the diameter of the cross-section of the snap ring 31b. FIG. 3 shows one example of the dimensions of the installation portion for the case where the diameter of this cross-section is 1.7 mm. In the case where the pitch circle diameter is 30 mm, the diameter of the cross-section is not limited to 1.7 mm, and can be appropriately set within a range of for example 1.7~2.5 mm.

Further, in the central bore of the hub 5b, the part nearer the outer end opening than the engaging step portion 32a is formed with no female spline teeth and with a simple cylindrical surface. That is, the central bore of the hub 5b is divided into the spline bore 15 and a simple circular bore 48 with a larger diameter than the spline bore 15, with the engaging step portion 32a as a the border therebetween. Furthermore, the snap ring 31b is fitted into the engaging groove 47 prior to insertion of the spline shaft 18 into the spline bore 15. When the spline shaft 18 is inserted into the spline bore 15, the snap ring 31b passes through inside the spline bore 15 with the diameter resiliently contracted. Then, in the condition with the snap ring 31b matching with the engaging step portion 32a, the diameter thereof is resiliently restored, and similarly to above, the snap ring 31b is spanned between the engaging step portion 32a and the engaging groove 47.

Furthermore, an opening portion on the outer end side of the central bore of the hub 5b is covered by a cap 49. On the other hand, a seal ring 51 is externally fitted to an outer peripheral face of a shoulder 50 formed on a base end of the outer ring 16b for constant velocity joint constituting the drive member 19b. This seal ring 51, in a condition externally secured to the shoulder 50, is resiliently compressed between the inside face of the crimped portion 42a and the outside face of the outer ring 16b for constant velocity joint, thus closing off a gap between the crimped portion 42a and the outer ring 16b for constant velocity joint.

In this manner, in the case shown in the figure, foreign matter such as muddy water is prevented from entering into the spline engaging portion 52 between the spline shaft 18 and the spline bore 15, by the cap 49 and the seal ring 51, thus preventing rusting of the spline engaging portion 52. Further, in the example shown in the figure, the outside face of the shoulder 50 and the part near the inner diameter of the inside face of the crimped portion 42a face each other via the gap 53. In the case where a large thrust load is applied between the hub 5b and the drive member 19b in a direction to make the hub 5b and the outer ring 16b for constant velocity joint approach each other, the gap 53 is lost, and the outside face of the shoulder 50 and the part near the inner diameter of the inside face of the crimped portion 42a are abutted together. In this condition, the hub 5b and the outer ring 16b for constant velocity joint cannot come any closer together. Therefore, the size of the gap 53 is appropriately constrained so that even with a large thrust load, the seal ring 51 is not excessively compressed. A proviso is that the interference of the seal lip of the seal ring 51 in a condition with the size of the gap 53 a maximum, is greater than the settling amount of the seal ring 51 with use over a long period. The reason for this is in order to maintain the resilient compression condition of the seal ring 51 between the inside face of the crimped portion 41a and the outer end face of the outer ring 16b for constant velocity joint, even in the case where the seal ring 51 has settled.

Of the bearing unit 3c for wheel drive constructed as mentioned above, the portion shown by a diagonal grid hatching in FIG. 2 on a part of the surface of the hub 5b and drive member 19b is quench-hardened by induction quench-hardening. Firstly, of the outer peripheral face of the hub 5b, the intermediate portion excluding the axially opposite ends is quench-hardened. Regarding the quench-hardened portion related to the outer peripheral face of this hub 5b, describing from the outside, the base end portion of the second flange 11 for supporting the wheel on this hub 5b is quench-hardened. This portion is hardened in order to improve the bending rigidity of the second flange 11, and so that the second flange 11 does not bendingly deform in spite of the moment applied from the vehicle wheel at the time of traveling, and at the same time to suppress wear accompanying sliding of a seal lip constituting a seal ring 54 which is secured to the outer end of an outer ring 4.

Next, the portions of an first inner ring raceway 12 and a stepped face 46 existing at the innermost end of the small diameter step portion 13 and abutted against the outer end face of the inner ring 6 is quench-hardened. The portion of first inner ring raceway 12 is quench-hardened to improve the rolling fatigue life of the portion of first inner ring raceway 12. Furthermore, the portion of the stepped face 46 existing at the innermost end of the small diameter step portion 13 is quenched-hardened to sufficiently increase the thrust load that this portion of the stepped face 46 can bear. Consequently, in the condition with the outer end face of the inner ring 6 abutted against the stepped face 46, when the crimped portion 42a is formed on the inner end of the hub 5b to secure the inner ring 6 to the hub 5b, the portion of stepped face 46 cannot be plastically deformed. As a result, an appropriate pre-load is applied to each rolling element 7 by the clamping of the inner ring 6 with the crimped portion 42a.

Furthermore, on the inner peripheral face of the hub 5b, the engaging step portion 32a and the portion near the engaging step portion 32a is hardened by induction quench-hardening. The induction quench-hardening of these portions is performed in order to prevent plastic deformation in the case where the engaging step portion 32a is strongly pressed by the snap ring 31b, and to reliably prevent the engagement between the engaging step portion 32a and the snap ring 31b from being separated from each other. In the case of the present example, because the engaging step portion 32a and the small diameter step portion 13 are separated from each other, the quench-hardened layer of the portion of engaging step portion 32a and the quench-hardened layer of the portion of stepped face 46 are not connected to each other. Consequently, the quench-hardened layer does not penetrate through both the inner and the outer peripheral faces of the hub 5b. Hence the shock resistance (tenacity) of the hub 5b can be ensured. On the other hand, in the case where the engaging step portion provided on the inner peripheral face of the hub and the stepped face provided on the outer peripheral face are adjacent to each other, when the quench-hardened layer is formed in the engaging step portion, there is the possibility for the quench-hardened layer to penetrate through both the inner and outer peripheral faces of the hub. In such a case, it becomes difficult to ensure the shock resistance of the hub. Therefore, no quench-hardened layer is formed in the engaging step portion (no quench-hardening is conducted).

Furthermore, regarding the drive member 19b, the outer peripheral face from the base end to the middle portion of the spline shaft 18 is quench-hardened. Further, in the example shown in the figure, a portion of the outer end face abutted against the inner diameter side half of the seal ring 51 of the outer ring 16b for constant velocity joint is also quenched-hardened. Of these, the base end of the spline shaft 18 is quench-hardened to ensure the fatigue strength of this base end with respect to the bending moment repeatedly applied to the spline shaft 18 at the time of traveling. Furthermore, the middle portion of the spline shaft 18 is quench-hardened to suppress plastic deformation and wear of a male spline portion 29a formed on the outer peripheral face of the spline shaft 18. Moreover, the outer end face of the outer ring 16b for constant velocity joint is quench-hardened to suppress deformation of the bearing face of the seal ring 51 and thus ensure the seal performance due to the seal ring 51. Furthermore, in the example shown in the figure, because the outer end portion of the outer ring 16b for constant velocity joint is made thin in order to lighten the outer ring 16b for constant velocity joint, this portion is also quench-hardened for strength retention of this portion.

Moreover, of the inner peripheral face of the outer ring 16b for constant velocity joint, the portions of each outside engaging groove 20 and the cage guide face 25 existing between each pair of the circumferentially adjacent outside engaging grooves 20 are quenched-hardened. Of these, the portion of outside engaging groove 20 are quench-hardened in order to improve the rolling fatigue life of the portion of outside engaging groove 20. Furthermore, the portion of cage guide face 25 is quenched-hardened in order to improve the wear resistance and seizure resistance of the portion of cage guide face 25 which comes rubbingly in contact with the outer peripheral face of the cage 24 constituting the constant velocity joint 2c. Consequently, the portion of the inner peripheral face of the outer ring 16b for constant velocity joint where the outside engaging grooves 20 and the cage guide faces 25 are formed, is quench-hardened around the entire periphery.

On the other hand, the inner peripheral face of the hub 5b, excluding the portion corresponding to the engaging step portion 32a, is not quench-hardened. In particular, the portion positioned on the inner diameter side of the quench-hardened portion corresponding to the small diameter step portion 13, is not quench-hardened. In this manner, because the portion positioned on the inner diameter side of the quench-hardened portion corresponding to the small diameter step portion 13 is not quench-hardened, the quench-hardened portion does not penetrate through from the inner peripheral face of the hub 5b to the outer peripheral face thereof. That is, because the distance between the quench-hardened portion corresponding to the small diameter step portion 13 and the inner peripheral face of the hub 5b is short (the relevant portion is thin), if the inner diameter side of this portion is quench-hardened, the quench-hardened layer at this portion may penetrate through from the inner peripheral face of the hub 5b to the outer peripheral face thereof. The quench-hardened layer, although being difficult to deform, is brittle with poor toughness, and is easily broken due to the impact load. Therefore, it is not desirable for the quench-hardened layer to penetrate through the inner and outer peripheral faces of the hub 5b. On the other hand, in the case of the hub 5b constituting the wheel drive unit of the present invention, the partial existence of brittle portions is prevented, so that it is possible to prevent the occurrence of damage such as cracking in the hub 5b or a drop in impact resistance of the hub 5b accompanying the quench-hardening process for the hub 5b.

Furthermore, with respect to this hub 5b, neither the portion for forming the crimped portion 42a, that is, the cylindrical portion formed on the inner end of the hub 5b, nor the portion at the tip end (the outer end) of the spline shaft 18 where the engaging groove 47 is formed, are quench-hardened. Of these, the cylindrical portion for forming the crimped portion 42a is not quench-hardened but is left as it is so as to form a high quality crimped portion 42a without the occurrence of damage such as cracking in the crimped portion 42a, when forming the crimped portion 42a in order to connectingly secure the inner ring 6 to the hub 5b. Furthermore, the portion at the tip end of the spline shaft 18 in which the engaging groove 47 is formed is not quench-hardened but is left as it is so as to prevent damage such as cracks developing from small notches, due to heat treatment.

The wheel drive unit of the present example is formed by combining the bearing unit 3c for wheel drive constructed as mentioned above, with a drive shaft 28, as shown in FIG. 1, and a constant velocity joint 33 of the tripod type, being the first constant velocity joint described in the claims. That is, a male spline portion 29b provided on the outer end of the drive shaft 28 is spline engaged with the second spline bore 21 provided at the center of the inner ring 17 for constant velocity joint constituting the bearing unit 3c for wheel drive. Then, the snap ring 37 stoppingly engaged in the engaging groove 30 formed around the whole periphery of the outer peripheral face at the outer end of the male spline portion 29b, is connected to the engaging step portion 32 formed on the opening rim at the outer end of the second spline bore 21, thereby preventing the male spline portion 29b from coming out from the second spline 21. Moreover, the inner end of the drive shaft 28 is connectingly secured to the center of the trunnion 34 of the constant velocity joint 33 provided on the output shaft of the differential gear.

That is, the inner end of the drive shaft 28 is connected to the center of the trunnion 34 constituting the constant velocity joint 33 provided on the end of the output shaft of the differential gear (not shown in the figure). Furthermore, a pair of boots 56a and 56b for preventing grease leaks and preventing the ingress of foreign matter are respectively secured between the outer peripheral faces at the intermediate portion of the drive shaft 28 and the peripheral face at the outer end of the housing 55 constituting the constant velocity joint 33 and the peripheral face at the inner end of the outer ring 16b for constant velocity joint. Each of these boots 56a and 56b is formed in an overall cylindrical shape with the intermediate portion formed in a bellows shape.

According to the wheel drive unit of the present invention constructed as mentioned above, connection between the rolling bearing unit 1c for wheel support and the constant velocity joint 2c which constitute the wheel drive bearing unit 3c is performed by the snap ring 31b. Therefore, simplification of the assembly operation is devised in a similar manner to the case of the beforementioned second example of the conventional construction shown in FIG. 7. However, according to the wheel drive unit of the present invention, because as mentioned before, each constituent element of the bearing unit 3c for wheel drive is regulated for optimum properties, the durability of the bearing unit 3c for wheel drive can be ensured.

Figure 4:
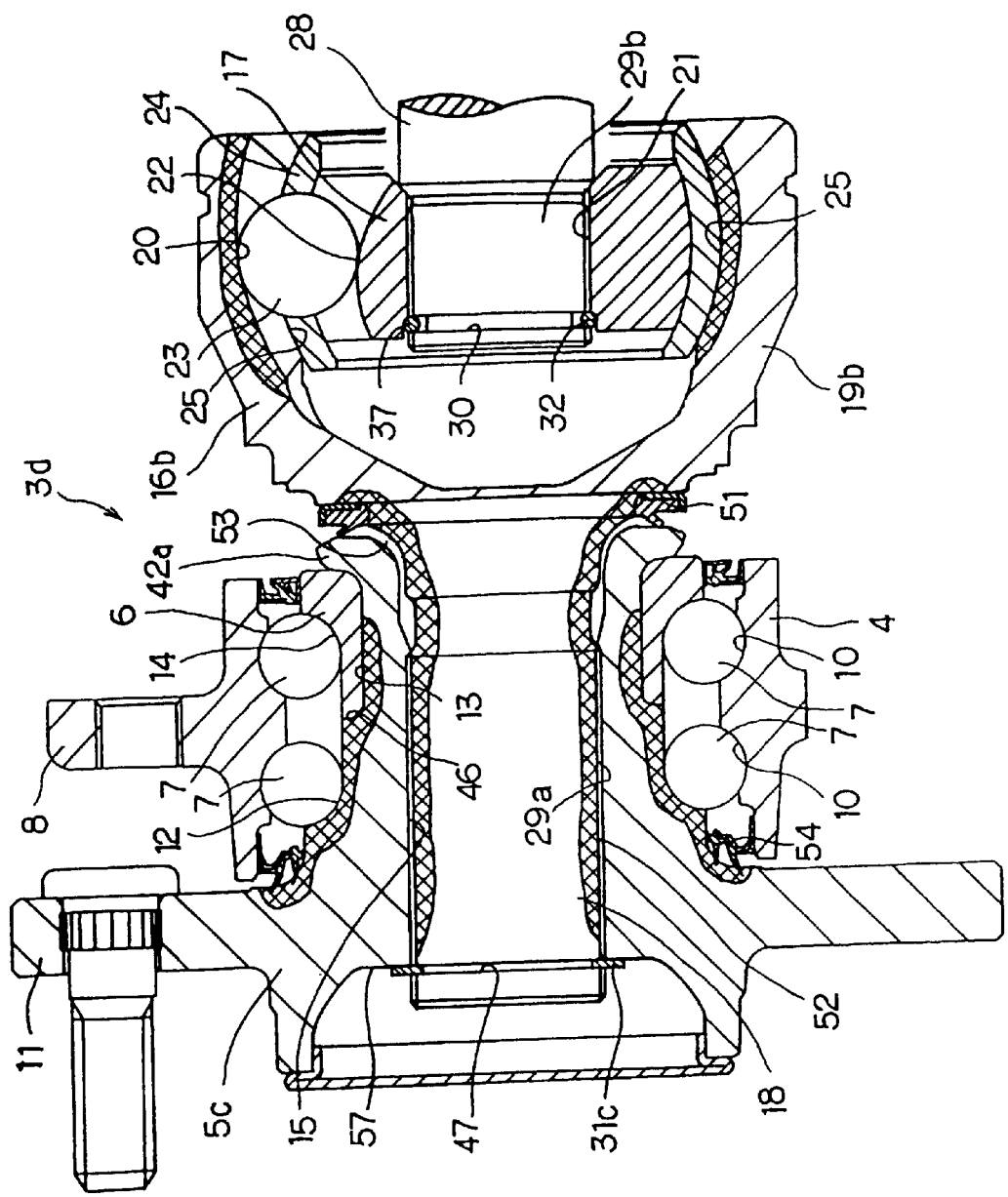
FIG. 4 is a cross sectional view to show a second example of the embodiment of the present invention.

Next, FIG. 4 shows a second example of an embodiment of the present invention. In the case of this example, a radially wide stepped face 57 is formed on an opening rim at the outer end of a spline bore 15 at an intermediate part of a hub 5c constituting a wheel drive bearing unit 3d. This stepped face 57 corresponds to the first engaging portion described in the claims. Moreover, a snap ring 31c is provided to have the inner periphery thereof stoppingly engaged in an engaging groove 47 being the second engaging portion, formed in a tip end of a spline shaft 18, and the half on the outer diameter side of the snap ring 31c is engaged with the stepped face 57, thereby preventing the spline shaft 18 from coming out from the spline bore 15.

In the case of the present example, a radially wide ring in a semi-circle annular shape with a discontinuous portion provided at one circumferential location, is used for the snap ring 31c. Therefore, the contract area of the snap ring 31c and the stepped face 57 is large so that the contact face pressure can be reduced. Consequently, in the case of the present example, even if this stepped face 57 is not quench-hardened in particular, plastic deformation of the stepped face 57 can be prevented. The construction and operation of other parts is substantially the same as for the case of the first example.

Figure 5:
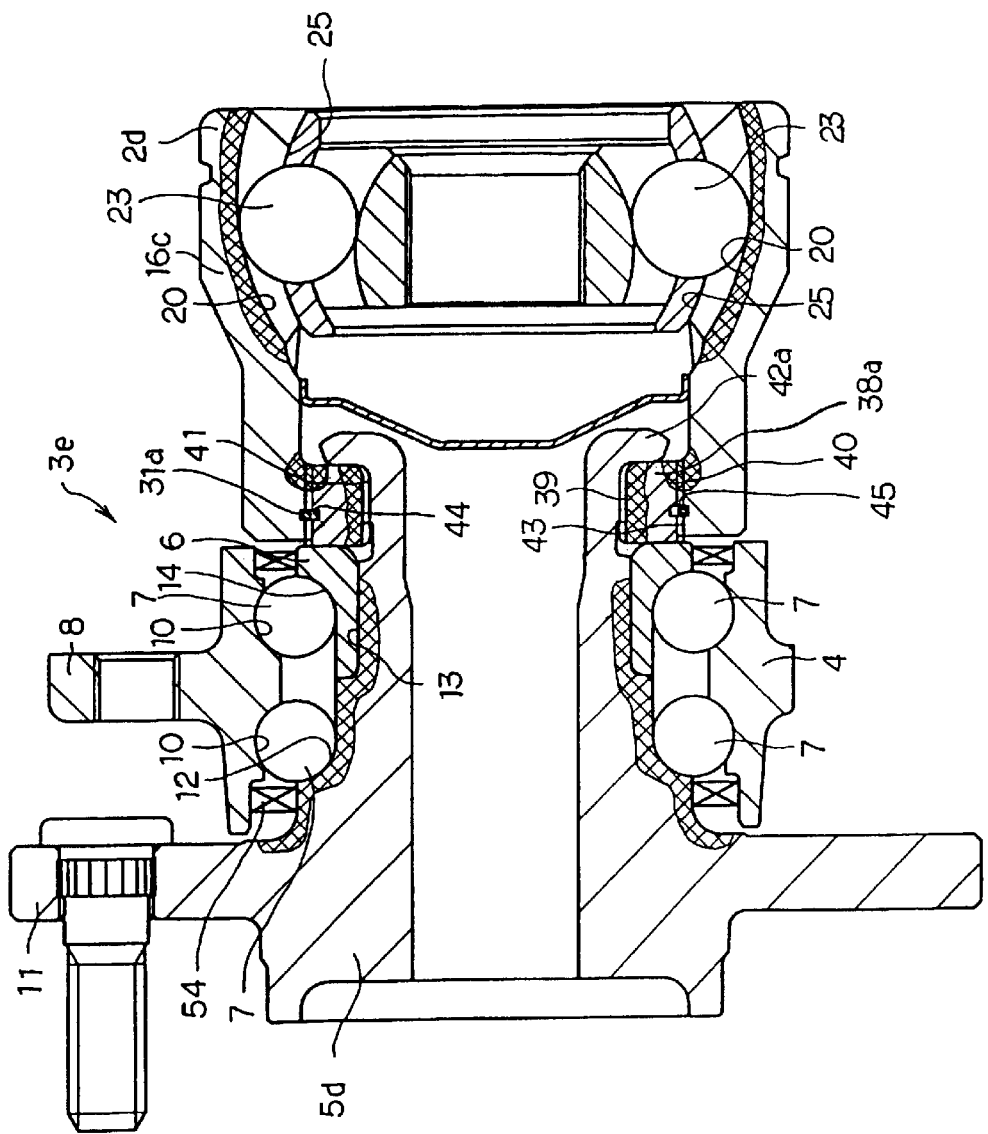
FIG. 5 is a cross sectional view to show a third example of the embodiment of the present invention.

Next, FIG. 5 shows a third example of an embodiment of the present invention. This example shows the case where the present invention is applied to the construction of the third example of the conventional construction shown in FIG. 8. An outer ring 16c for constant velocity joint constituting a constant velocity joint 2d, and corresponding to the drive member described in the claims, is connected to an inner end of a hollow hub 5d constituting a bearing unit 3e for wheel drive, via a spacer 38a serving as a connecting member. Of the inner and outer peripheral faces of the spacer 38a, the inner peripheral face formed with a female spline portion 39 on the inner diameter side is quench-hardened along the entire axial length, and the outer peripheral face formed with a male spline portion 40 on the outer diameter side corresponding to the first spline portion described in the claims, excluding an inside engaging groove 44 corresponding to the first engaging portion described in the claims, is quench-hardened. Furthermore, the female spline portion 43 on the outer diameter side corresponding to the second spline, formed on the inner peripheral face at the outer end of the constant velocity joint outer ring 16c corresponding to the drive member described in the claims, excluding an outside engaging groove 45 corresponding to the second engaging portion, is also quench-hardened. Other than this, regarding the basic construction of the bearing unit 3e for wheel drive, this is similar to the third example of the conventional construction shown in FIG. 8, and the quench-hardened portions and the non-quench-hardened portions are similar to the first and the second embodiments of the present invention.

In the case of working the present invention, regarding the form of each of the female spline portion and the male spline portion formed for performing torque transmission, various forms can be adopted. For example, both of the spline portions may be parallel splines constructed from spline teeth having axially parallel side faces, or may be tapered splines constructed from spline teeth where each of the spline teeth has side faces slightly inclined in mutually opposite directions with respect to the axial direction. Moreover, these may be twisted splines where only the female spline portion is a parallel spline, and opposite side faces of the spline portions constituting the male spline are slightly inclined in the same direction with respect to the axial direction.

Furthermore, in the case of working the present invention, the portions such as the engaging groove formed in the member provided with the male spline is not quench-hardened, and is left as they are. That is, all or part of the male spline portion formed in the member provided with the male spline portion, is quench-hardened, but in any case, the portions such the engaging groove are left as they are. On the other hand, regarding the female spline portion, it is optional as to whether or not this quench-hardened, and in the case where this is quench-hardened, the range over which this is quench-hardened can be freely selected. Moreover, in this case, it is possible to appropriately select whether or not to quench-harden the connecting installation portion such as the engaging step portion provided on the inner peripheral face of the member provided with the female spline portion, where damage such as cracking due to heat treatment does not develop easily compared to the engaging groove. For example, in the case where the whole female spline portion is not quench-hardened, the engaging step portion and the like are also not quench-hardened. Furthermore, in the case where only part of the female spline portion is quench-hardened, the engaging step portion and the like may or may not be quench-hardened. Moreover, in the case where the whole female spline is subjected to quench-hardening treatment, the engaging step portion and the like may be subjected to quench-hardening treatment, or only this engaging step portion and the like may be not subjected to quench-hardening treatment. In each example of the embodiments, regarding the quench-hardening of the outer ring 4 constituting the rolling bearing unit for wheel support, because this is similar to the case of the conventional construction, diagrams and explanation of the quench-hardened portions are omitted.

Furthermore, with regards to the surface roughness of both of the male and female spline portions, this can be established by design, but, for example, regarding the male spline, by making it with a rolling process, the surface roughness can be regulated to around 3.2 S. Furthermore, regarding the female spline portion, by making it with a broach process, the surface roughness can be regulated to around Ra 6.3.

APPLICABILITY TO THE INDUSTRY

The present invention is constructed and operates as described above, thus enabling a wheel drive unit with superior durability to be realized at a low cost.

What is claimed is:

1. A vehicle wheel drive unit comprising a rolling bearing unit for a vehicle wheel, a constant velocity joint unit and a snap ring, the constant velocity joint unit comprising a first constant velocity joint having an output portion and a input portion connected to an output portion of a differential gear, a transmission shaft having an output end and an input end connected to the output portion of the first constant velocity joint, and a second constant velocity joint having an output portion and an input portion connected to the output end of the transmission shaft, the rolling bearing unit for vehicle wheel comprising an outer ring having an inner peripheral surface formed with outer ring raceways and being not rotatable during use, a hollow hub having an outer peripheral surface formed with an flange for supporting a vehicle wheel near the outer end thereof, with a first inner ring raceway at the middle portion thereof, and with a small diameter stepped portion formed near the inner end thereof, an inner ring having an outer peripheral surface formed with a second inner ring raceway and fitted onto the small diameter stepped portion of the hub, the hub having the inner end plastically deformed radially outward to form a crimped portion to prevent the inner ring from coming out of the smaller diameter portion, a plurality of rolling members rotatably provided between each of the outer ring raceways and the first and second inner ring raceways, and a first spline portion provided on a peripheral surface portion of the hub or a member securely connected to the hub, the second constant velocity joint comprising a drive member having a peripheral surface at the outer end thereof formed with a second spline portion in spline engagement relation with the first spline portion, and an outer ring at the inner end thereof to constitute the second constant velocity joint, a first engagement portion provided on a peripheral surface portion of the hub or a member securely connected to the hub, a second engagement portion provided on the peripheral surface of the outer end of the drive member, the snap ring spanned between the first engagement portion and the second engagement portion to prevent disengagement between the first spline section and second spline section, the smaller diameter stepped portion of the hub having a stepped face portion at the innermost end thereof, the inner ring having an inner end surface abutted to the stepped face portion, on the outer peripheral surface of the hub, at least the first inner ring raceway and the stepped surface portion being quench-hardened, on the inner peripheral surface of the hub, at least a portion located on the inner diameter side of the quench-hardened stepped surface portion, and the crimped portion being not quench-hardened, at least one of the hub or the member securely connected to the hub and the drive member having a peripheral portion being formed with an engagement groove for the first and second engagement portions and not quench-hardened, the outer ring of the second constant velocity joint being formed with outside engagement groove portions on the inner peripheral surface thereof with cage guide portions each existing between a circumferentially adjacent pair of the cage guide portions, and on the inner peripheral surface of the outer ring of the second constant velocity joint, at least the outside engagement groove portions and the cage guide portions being quench-hardened.

2. The vehicle wheel drive unit of claim 1, wherein the drive member has an outer end formed with a spline shaft, the first spline portion is a female spline portion formed on the inner peripheral surface of the hub, the second spline portion is a male spline portion formed on the outer peripheral surface of the spline shaft of the drive member, the first engagement portion is an engagement step portion formed on the inner peripheral surface of the hub near the outer end thereof, the second engagement portion is an engagement groove formed on the outer peripheral surface of the spline shaft at the outer end thereof, and the spline shaft having a base end having an outer peripheral surface quench-hardened.

* * * * *